United States Patent [19]
Moro et al.

[11] Patent Number: 6,150,626
[45] Date of Patent: Nov. 21, 2000

[54] WIRE ELECTRIC-DISCHARGE MACHINE

[75] Inventors: Toshio Moro; Youichi Ootomo, both of Tokyo, Japan

[73] Assignee: Mitsubishi Denki Kabushiki Kaisha, Tokyo, Japan

[21] Appl. No.: 09/141,109

[22] Filed: Aug. 27, 1998

[30] Foreign Application Priority Data

Feb. 19, 1998 [JP] Japan ................................ 10-037136

[51] Int. Cl.⁷ .................................................... B23H 7/10
[52] U.S. Cl. ............................................ 219/69.12
[58] Field of Search ........................................ 219/69.12

[56] References Cited

U.S. PATENT DOCUMENTS

| | | | |
|---|---|---|---|
| 4,539,459 | 9/1985 | Yamagata | 219/69.12 |
| 4,896,013 | 1/1990 | Fricke et al. | 219/69.12 |
| 4,994,643 | 2/1991 | Truty et al. | 219/69.12 |
| 5,126,524 | 6/1992 | Moro et al. | 219/69.12 |
| 5,268,552 | 12/1993 | Onzuka et al. | 219/69.12 |
| 5,380,973 | 1/1995 | Truty et al. | 219/69.12 |

FOREIGN PATENT DOCUMENTS

| | | |
|---|---|---|
| 57-121421 | 7/1982 | Japan . |
| 59-116126 | 8/1984 | Japan . |
| 60-104618 | 6/1985 | Japan . |
| 60-238233 | 11/1985 | Japan ................................ 219/69.12 |
| 4-30919 | 2/1992 | Japan . |
| 4-315520 | 11/1992 | Japan ................................ 219/69.12 |
| 10-156629 | 6/1998 | Japan . |

*Primary Examiner*—Geoffrey S. Evans
*Attorney, Agent, or Firm*—Sughrue, Mion, Zinn, Macpeak & Seas, PLLC

[57] ABSTRACT

In a wire electric-discharge machine, a lower wire guide holder is formed in the shape of a disk, and an electrical supply die is disposed immediately therebelow. Further, the electrical supply die is provided with a shaft and a knob, the shaft is positioned by a supporting block and is fixed by a bolt. A jet nozzle is disposed above an upper nozzle via a spring, and an upper wire guide holder is provided inside the jet nozzle. Further, an upper guide and a lower guide are each provided with a passage formed by an insulating material and adapted to supply a coolant separately from a passage for a working fluid. Further, the lower guide is provided with a negative-pressure generating device, a tip of a lower nozzle is made flat, and a net is provided inside the lower nozzle. In addition, an inclined nozzle is provided in a jetting port of the lower nozzle.

13 Claims, 12 Drawing Sheets

WIRE ELECTRIC-DISCHARGE MACHINE

BACKGROUND OF THE INVENTION

1. Field of the Invention

The present invention relates to a wire electric-discharge machine for machining a workpiece by supplying electricity to a wire electrode.

2. Description of the Related Art

FIG. 1 is a diagram schematically illustrating a wire electric-discharge machine.

In the drawing, reference numeral 1 denotes a bed, i.e., a base of the machine, on which an X-Y axis driving unit is mounted. Numeral 2 denotes an X-axis table which is movably supported by means of an X-axis slide 4 which, in turn, is movably supported by an X-axis guide 3 fixed to the bed 1. Numeral 5 denotes an X-axis ball screw; 6, a table for fixing a workpiece; 7, a processing tank for storing a working fluid; and 8, a column for supporting a Z-axis unit 9, a lower arm 10a being fixed to the column 8. Further, the column 8 is either fixed or movable along the direction of the longitudinal axis of the lower arm 10a. A lower guide 11a is attached to a distal end of the lower arm 10a, and effects a change in the direction of a wire electrode 12 by means of a roller provided therein.

Numeral 13a denotes an upper guide fixed to a distal end of the Z-axis unit 9. Numeral 14 denotes a Y-axis guide which is fixed to the top of the bed 1, and a Y-axis slide 15 is engaged therewith and is supported in such a manner as to be movable in the axial direction. Numeral 16 denotes a Y-axis ball screw, and 17 and 18 denote Y-axis and X-axis motors, respectively. Numeral 19 denotes a wire recovering device which supports a recovery roller 20 for recovering the wire electrode 12 and is fixed to the column 8. Numeral 21 denotes a recovery box for accommodating the recovered wire electrode 11. Numeral 22 denotes a wire bobbin; 23, a pad disposed underneath the bed; and 24, a leveling bolt for adjusting the inclination of the overall machine. Next, a detailed description will be given of the lower guide 11a.

FIGS. 15 and 16 are diagrams illustrating the conventional lower guide in the wire electric-discharge machine shown in FIG. 1. FIG. 15 is a horizontal sectional view of a portion of the lower guide 11a, and FIG. 16 is a longitudinal sectional view taken along the axial direction of the lower guide 11a.

The lower guide 11a is fixed to a distal end of the lower arm 10a by means of bolts 202 via an insulating plate 201. This attaching surface is perpendicular to the distal end of the lower arm 10a. The lower guide 11a is mainly comprised of a lower nozzle 203, an electrical supply die 204, a lower wire guide holder 205, a guide supporting plate 206, and a lower block 207, and the fixing of the lower guide 11a to the lower arm 10a is mainly effected by the lower block 207.

The lower wire guide holder 205 has an elongated hollow cylindrical shape, is provided with a wire guide 205a at its upper distal end for precisely guiding the wire electrode, and is screwed into and fixed in the lower block 207. The lower block 207 includes a roller 208, and a change in the direction of the wire electrode 12 is effected by a wire passage 207c. The wire passage 207c has a tapered wire inlet 207a and a tapered wire outlet 207b. A recovery pipe 209 is connected to the outlet 207b. Further, a lower transport-stream outlet 210 is provided to allow a transport stream to spout for transporting to the wire recovering device 19 the wire electrode 12 whose direction has been changed by the roller 208.

The guide supporting plate 206 incorporates the electrical supply die 204. The electrical supply die 204 is fixed between the guide supporting plate 206 and an electrical-supply-die holding plate 211. In addition, the guide supporting plate 206 incorporates a drawing-out board 212 for drawing out the electrical supply die 204. Numeral 213 denotes a lower auxiliary guide which is structured so as to press the wire electrode 12 against the electrical supply die 204 in cooperation with the lower wire guide holder 205.

The lower nozzle 203 is a portion for jetting a working fluid, and a working fluid is supplied to its interior as a high-pressure fluid through a pipe 214. Numeral 215 denotes a spring, and 216 denotes a pressing plate of the lower nozzle 203. During machining, the lower nozzle 203 is raised by means of the working fluid supplied to its interior while compressing the spring 215, and is stopped by the pressing plate 216, and during nonmachining, the lower nozzle 203 returns downward since the working fluid is not supplied. In addition, the lower nozzle 203 has such a configuration that the cross-sectional area of its upper surface decreases gradually toward its distal end so as not to come into contact with the lower wire guide holder 205 when the working fluid ceases to be supplied and the lower nozzle 203 returns downward.

Reference numeral 217 denotes the wiring which is connected to the supporting plate 206 so as to supply a working electric current from a power supply to the electrical supply die 204. Naturally, the guide supporting plate 206 is formed of an electrically conductive material. Reference numeral 218 denotes a bolt which serves to fix the guide supporting plate 206 onto the lower block 207. A passage 219 is provided in a distal end portion of the lower wire guide holder 205 in the vicinity of the wire guide 205a. This passage 219 is used to allow the working fluid to flow for cooling the heat which is generated due to electrical discharge through contact energization between the electrical supply die 204 and the wire electrode 12 as well as Joule heat which is generated as electric current flows across the wire electrode 12. This passage 219 is formed by branching a portion of the pipe 214 to supply the working fluid without causing a decline in the internal pressure of the lower nozzle 203. Further, the working fluid for cooling passes through the lower auxiliary guide 213 and the recovery pipe 209, flows in the downstream direction, and is recovered.

Reference numeral 220 denotes a terminal to which the wiring 217 is connected and which is disposed on a side surface of the guide supporting plate 206. Numeral 221 denotes a pipe end, to which the pipe 214 is connected and which is disposed on a side surface of the guide supporting plate 206. Numeral 222 denotes a rectifying plate which is located inside the lower nozzle 203 to rectify the flow of the working fluid sent front the pipe end 221 to the interior of the lower nozzle 203. Numeral 223 denotes a bolt.

Further, a detailed description will be given of the upper guide 13a.

FIG. 17 is a longitudinal sectional view taken along the axial direction of the upper guide 13a shown in FIG. 1.

The upper guide 13a is fixed to a distal end of the Z-axis unit 9 by means of an attaching plate 250. Numeral 251 denotes an upper block to which are attached an electrical supply die 252, an upper wire guide holder 253, a housing 254, a jet nozzle 255, and upper nozzle 256. The upper wire guide holder 253 has an elongated hollow cylindrical shape, is provided with a wire guide 253a at its lower distal end for precisely guiding the wire electrode, and is screwed into and fixed in the upper block 251.

The jet nozzle 255 is used to insert the wire electrode 12 by guiding the same by means of a water jet, and is accommodated in the space between the housing 254 and the upper wire guide holder 253 by means of a spring 257 in such a manner as to be movable in the vertical direction.

Reference numeral 258 denotes a working fluid passage for supplying a pressurized working fluid. This working fluid supplied to the upper guide 13a first enters a space 254a surrounded by the housing 254 and the upper nozzle 256, then passes through a working fluid passage 254b in the housing 254, is further sent to a space 254c surrounded by the housing 254 and a tip portion of the upper nozzle 256, and is jetted out from a jetting port 256a provided in the tip of the upper nozzle 256. Incidentally, such a method of transporting a working fluid is also described in Japanese Patent Application Laid-Open No. 121421/1982. In addition, in the upper wire guide holder 253 as well, a passage 259 is provided in the vicinity of an upper portion of the wire guide 253a in the same way as in the lower wire guide holder 205. This passage 259 is used to take in the working fluid by making use of the internal static pressure within the upper nozzle 256 during machining, and is used for cooling the wire electrode 12 inside the upper wire guide holder 253 and for cooling a contact energization portion of the electrical supply die 252.

Reference numeral 260 denotes a jet pipe which is passed through the attaching plate 250 and the upper block 251, and leads to the portion of the upper wire guide holder 253 which is attached to the upper block 251. The working fluid flows in the interior of the jet pipe 260, and the arrangement provided is such that, after being temporarily accumulated in the internal space of the jet nozzle 255, the working fluid spouts from the tip of the jet nozzle 255 in the form of a jet stream of a small diameter so as to supply the wire electrode 12 to the lower guide 11a. Numeral 261 denotes an upper auxiliary guide; 262, an electrical-supply-die pressing plate for the electrical supply die 252; and 263, a drawing-out board.

As described above, in the lower guide 11a of the conventional wire electric-discharge machine, the wire electrode is sent from the upper guide 13a to the lower guide 11a, the working electric current is supplied to the wire electrode 12 by the electrical supply die 204 and is transmitted to a workpiece so as to be used in machining. In this case, in portions of contact between the electrical supply die 204 and the wire electrode 12, heat is generated due to a very small amount of electrical discharge, and Joule heat is also generated as the electric current flows across the wire electrode 12. Therefore, the working fluid is allowed to flow along the wire electrode 12 to effect cooling by making use of the internal static pressure of the nozzle 203 through the passage 219 so as to prevent the wire electrode 12 from becoming cut off by this heat. However, since there is a distance between the electrical supply die 204 and the workpiece, the working electric current is limited owing to the resistance of the wire electrode 12 itself and an increase in resistance due to a temperature rise, so that there has been a problem in that the machining efficiency declines.

It should be noted that, in the conventional configuration, the lower wire guide holder 205 has a hollow cylindrical shape as illustrated, and the electrical supply die 204 is disposed below the lower wire guide holder 205, so that it is extremely difficult to locate the electrical supply die 204 close to the tip of the lower nozzle 203. A similar problem occurs with the upper guide 13a as well.

The electrical supply die 204 presses the wire electrode 12 against the guide supporting plate 206 by means of the electrical-supply-die holding plate 211 to provide reliable contact with the guide supporting plate 206, and contact-supplies to the wire electrode 12 the working electric current supplied from the wiring 217. In this case, if machining is effected by supplying electric power for a fixed time duration, the electrical supply die 204 becomes worn due to the effect of the very small amount of electrical discharge, so that it is necessary to periodically replace the electrical supply surface of the electrical supply die 204 which comes into contact with the wire electrode 12. In this replacement, it is necessary to remove the electrical-supply-die holding plate 211, draw out the electrical supply die 204 to the outside by means of the drawing-out board 212, index a new position for the electrical supply die 204, and then fix the electrical supply die 204 in the reverse order. Hence, there has been a problem in that this operation is troublesome, and that the machine must be stopped at the same time. A similar problem occurred with the upper guide 13a as well.

Further, if the diameter of the wire electrode 12 is different, the wire guide 253a of the upper wire guide holder 253 needs to be replaced with one which matches the same. As for the jet nozzle 255 as well, the selection of a jet nozzle optimally suited to the diameter of an insertion hole provided in the workpiece is important in enhancing the reliability of insertion. At the time of replacement of the wire guide 253a and the jet nozzle 255, it is necessary to remove the upper nozzle 256, the housing 254, and the jet nozzle 255, and subsequently remove the upper wire guide holder 253 from the upper block 251 by means of a tool or the like. During reinstallation, it is necessary to effect operation in the reverse order. Hence, there has been a problem in that disassembly and reinstallation have been time-consuming and troublesome.

Further, in the lower guide 11a, the working fluid is allowed to flow along the wire electrode 12 through the passage 219 from the interior of the lower nozzle 203 by making use of the back pressure so as to cool the wire electrode 12. However, because of the prevention of interference of the workpiece and the lower nozzle 203 with a jig or the like and because of steps in their configurations, there is a case where the workpiece and the lower nozzle 203 are disposed in spaced-apart relation to each other to effect machining, so that there has been a problem in that sufficient back pressure cannot be obtained, resulting in a shortage in a flow rate for cooling. Further, although it is possible to enlarge the passage 219 for solving this problem, the flow rate for cooling becomes too high in the case of contact machining in which the lower nozzle 203 is held in contact with the workpiece. As a result, secondary trouble such as the vibration of the wire electrode 12 can occur, or it becomes necessary to replace the guide with one in which the diameter of the passage 219 is different in correspondence with the machining state. Hence, the enlarging of the passage 219 is very inconvenient. A similar problem occurs with the upper guide as well.

In addition, in general, the passage 219 for cooling is frequently formed with a small diameter of 1 mm or less. However, if the lower wire guide holder 205 is magnetized due to the effect of the magnetic field where the working electric current flows, machining sludge and metal powder contained in the working fluid are deposited, and if the machine is used over extended periods of time, clogging can occur, and the flow rate for cooling becomes insufficient. Hence, there has been a problem in that periodic cleaning must be provided to overcome this problem. In particular, clogging is liable to occur during non-contact machining in which back pressure is difficult to operate. Incidentally, it is estimated that the action of a local cell occurring in the conductor in water also functions in this phenomenon, and it is difficult to overcome this phenomenon.

The wire electrode 12 which is passed through the lower guide 11a and is inserted has its direction changed by the roller 208 toward the wire recovering device 14, and is transported by the lower transport stream. However, as shown in FIG. 16, the lower transport-stream outlet 210 is provided on the same line as the recovery pipe 209, so that after the wire electrode passes through the lower auxiliary guide 213, the transport of the wire up to the roller 208 is left to the linearity based on the rigidity of the wire electrode 12 itself. Accordingly, there are cases where the wire electrode becomes buckled midway, so that there has been a problem in that trouble due to buckling or the like is unavoidable by the use of the wire inlet 207a alone.

In addition, the lower nozzle 203 of the lower guide 11a has such a configuration that its cross-sectional area decreases gradually toward its distal end, and the stream of the working fluid after passing through the rectifying plate 222 is temporarily accumulated in the inner space of the lower nozzle 203. Subsequently, the working fluid is jetted out from the jetting port, but since the working fluid is jetted out without conversion of dynamic pressure to static pressure, the velocity component of the stream does not become uniform at the jetting port and forms turbulence. Hence the working fluid jets out without its direction being fixed. For this reason, machining becomes incomplete, and if the flow rate of the working fluid is low, the stream becomes biased, so that there has been a problem that a large influence is exerted on the machining capability.

In particular, under the machining condition in which the working fluid needs to flow at a very small flow rate and a small working electric current is applied, or in a case where the diameter of the wire electrode 12 is made small, the turbulence of the working jet exerts a very large influence on the performance. Hence, a jet having a uniform flow rate is required, and the volume of the internal space of the lower nozzle 203 alone does not produce sufficient conversion to static pressure. Further, to obtain sufficient static pressure for the working fluid inside the lower nozzle 203, it is necessary to supply the working fluid to the interior of the lower nozzle 203 uniformly in a state in which the flow rate is reduced, and it is difficult to realize this state by the use of the few jetting ports conventionally provided.

Although the wire electrode 12 supplied from the upper guide 13a by means of the jet stream is guided to the lower guide 11a through the tapered guide provided at the distal end of the lower guide 11a, the jet stream does not necessarily advance straightly downward due to the shape of the workpiece or the shape of the wire passing hole. Hence, in a case where the jet stream has become biased, there has been a problem in that the wire electrode 12 fails to be inserted into the lower guide 11a, resulting in the shutdown of the machine or imposing restraints on the working profile.

It should be noted that a wire electric-discharge machine disclosed in Japanese Patent Application Laid-Open No. 104618/1985 is also known as a conventional example. In this wire electric-discharge machine as well, the wire holder has an elongated hollow cylindrical shape, and a substantial distance is present between the electrical supply die and the tip of the nozzle, and the problem that the working electric current is restricted is not solved.

In addition, a wire electric-discharge machine disclosed in Japanese Patent Application Laid-Open No. 30919/1992 is also known as a conventional example. The lower guide of this wire electric-discharge machine is structured such that the portion corresponding to the lower wire guide holder has not a hollow cylindrical shape but the shape of a rectangular parallelopiped, and the electrical supply die is provided therebelow. However, a substantial distance is present between the electrical supply die and the tip of the nozzle, and the problem that the working electric current is restricted is not solved.

In addition, as a conventional example there is known an electrical supply tip of a wire electric-discharge machine having a plurality of grooves as disclosed in Japanese Utility Model Application Laid-Open No. 89433/1986. Even if this electrical supply die is used, it is impossible to solve the problem that when the electrical supply tip has become worn due to the contact electric discharge, after removing the electrical supply tip and indexing a new position, it is necessary to fix the electrical supply tip in the reverse order, which requires time and trouble.

Furthermore, a wire electric-discharge machine disclosed in Japanese Utility Model Application Laid-Open No. 116126/1984 is also known as a conventional example. The shape of the lower nozzle of this wire electric-discharge machine is arranged such that its cross-sectional area decreases gradually toward its distal end. Even if a partition plate is provided, the problem that the velocity component of the stream does not become uniform at the jetting port and forms turbulence and the working fluid jets out without its direction being fixed is not sufficiently solved.

SUMMARY OF THE INVENTION

The present invention has been devised to overcome the above-described problems, and a first object of the invention is to obtain a wire electric-discharge machine in which the distance between the electrical supply die 204 and the workpiece is made short, thereby making it possible to prevent the wire electrode from being cut off by the heat generated due to contact between the electrical supply die and the wire electrode as well as Joule heat of the wire electrode.

A second object of the invention is to obtain a wire electric-discharge machine which makes it possible to easily change the surface of the electrical supply die which comes into contact with the wire electrode.

A third object of the invention is to obtain a wire electric-discharge machine which facilitates the removal and reinstallation of the wire guide and the jet nozzle of the upper guide.

A fourth object of the invention is to obtain a wire electric-discharge machine in which the coolant for cooling the heat generated through the energization of the wire electrode and the electrical supply die is constantly allowed to flow onto the wire electrode sufficiently.

A fifth object of the invention is to obtain a wire electric-discharge machine which is capable of preventing the wire electrode from buckling inside the lower nozzle during the insertion of the wire electrode.

A sixth object of the invention is to obtain a wire electric-discharge machine which is capable of preventing the working jet stream being jetted out from the jetting port of the lower nozzle from becoming disturbed.

A seventh object of the invention is to obtain a wire electric-discharge machine in which the wire electrode can be inserted easily from the upper guide into the lower guide.

In accordance with the present invention, there is provided a wire electric-discharge machine wherein a disk-shaped lower wire guide holder and a wire guide located in a central portion of the lower wire guide holder and having the same thickness as the lower wire guide holder are provided in the lower nozzle located in an upper portion of the lower guide and adapted to jet a working fluid, and the electrical supply die is disposed immediately below the lower wire guide holder.

In addition, the lower guide and the upper guide are each provided with a shaft which engages a center of the electrical supply die and renders the electrical supply die rotatable.

Further, the electrical supply die is formed in the shape of a disk, and has a multiplicity of grooves on its outer periphery.

Further, a multiplicity of grooves corresponding to the grooves of the electrical supply die are formed on the shaft, and a supporting block for positioning the shaft as a ball is engaged in one of the grooves of the shaft is provided.

Further, a knob for rotating the shaft is provided at a distal end of the shaft.

Further, the lower guide and the upper guide are each provided with a bolt abutting against the shaft for fixing the position of the shaft as well as a passage for accommodating the bolt.

In addition, in accordance with the present invention, there is provided a wire electric-discharge machine wherein a jet nozzle for inserting the wire electrode is provided above an upper nozzle of the upper guide via a spring such that jetting ports of the upper nozzle and the jet nozzle become coaxial, a disk-shaped upper wire guide holder and a wire guide located in a central portion of the upper wire guide holder and having the same thickness as the upper wire guide holder are provided in the jet nozzle, and the electrical supply die is disposed immediately above the upper wire guide holder.

In addition, in accordance with the present invention, there is provided a wire electric-discharge machine wherein the lower guide and the upper guide are each provided with a passage formed by an insulating material and adapted to supply a coolant to a wire passage where the wire electrode passes.

In addition, in accordance with the present invention, there is provided a wire electric-discharge machine wherein the lower guide and the upper guide are each provided with a passage for supplying a working fluid to a lower nozzle of the lower guide and an upper nozzle of the upper guide and a passage for supplying a coolant to a wire passage where the wire electrode passes.

In addition, in accordance with the present invention, there is provided a wire electric-discharge machine wherein there are provided a negative-pressure generating device having a central passage for allowing the wire electrode to pass in a downward direction of the lower guide and an inclined passage connected to the central passage inclined downward, as well as a pipe for supplying the working fluid to the negative-pressure generating device.

In addition, in accordance with the present invention, there is provided a wire electric-discharge machine wherein a lower nozzle in which a tip portion of a jetting port for jetting a working fluid is flat is provided at an upper end of the lower guide.

Further, a net is provided immediately below the jetting port inside the lower nozzle.

In addition, in accordance with the present invention, there is provided a wire electric-discharge machine wherein a lower wire guide holder having a two-layered structure with a space formed between two layers and a wire guide located in a central portion of the lower wire guide holder and having the same thickness as the lower wire guide holder are provided in a lower nozzle located in an upper portion of the lower guide and adapted to jet a working fluid, and a working-fluid supplying port for supplying the working fluid into the space in the lower wire guide holder is provided in a lower layer portion of the lower wire guide holder.

Further, a passage for supplying the working fluid into the lower nozzle is provided in an outer periphery of an upper layer portion of the lower wire guide holder.

In addition, in accordance with the present invention, there is provided a wire electric-discharge machine wherein an inclined nozzle having the shape of a triangular pyramid such that its diameter becomes gradually smaller in the downward direction is disposed in a nozzle opening in the lower guide.

DETAILED DESCRIPTION OF THE PREFERRED EMBODIMENTS

Now, a description will be given in more detail of preferred embodiments of the invention with reference to the accompanying drawings.

(FIRST EMBODIMENT)

Figure 1:
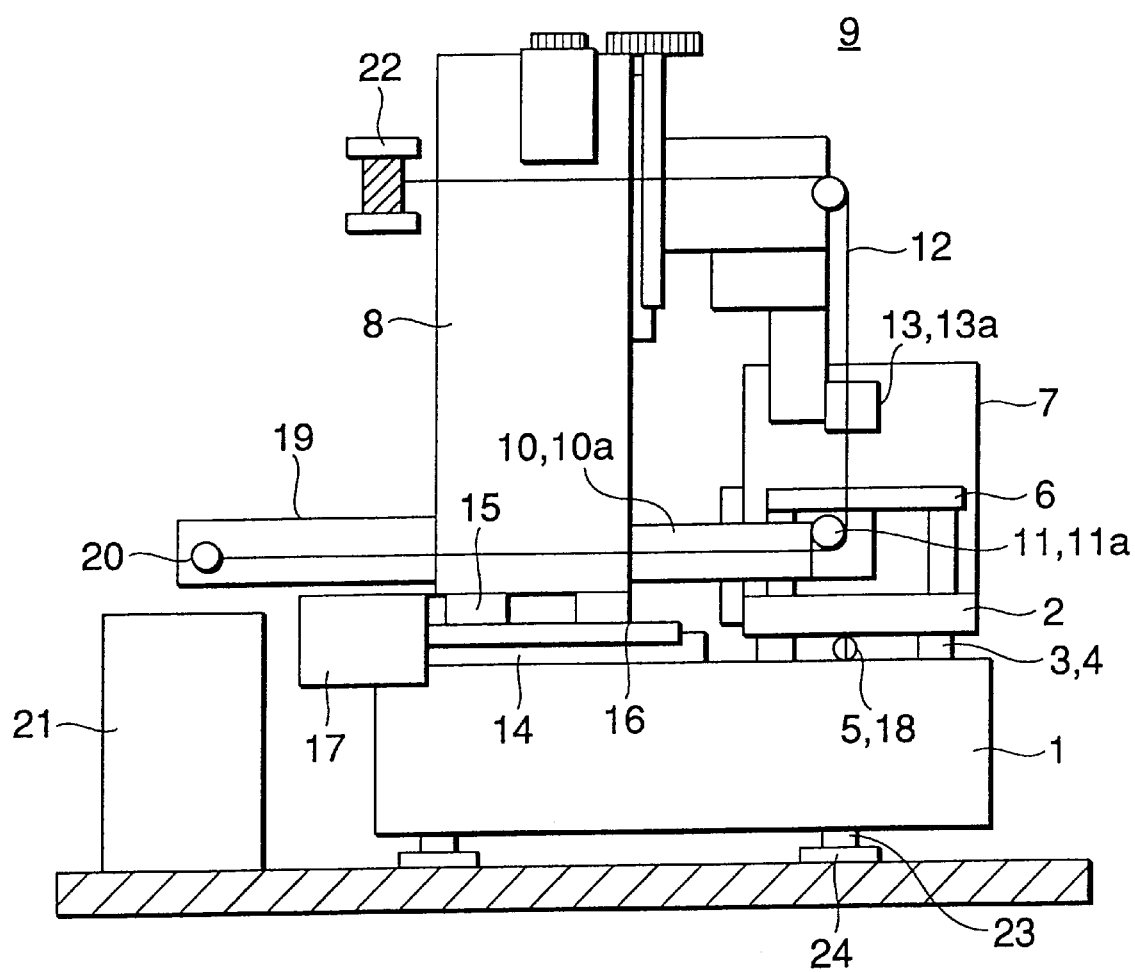
FIG. 1 is a diagram schematically illustrating a wire electric-discharge machine in accordance with the present invention.

FIG. 1 is a diagram schematically illustrating a wire electric-discharge machine.

In the drawing, reference numeral 1 denotes a bed, i.e., a base of the machine, on which an X-Y axis driving unit is mounted. Numeral 2 denotes an X-axis table which is movably supported by means of an X-axis slide 4 which, in turn, is movably supported by an X-axis guide 3 fixed to the bed 1. Numeral 5 denotes an X-axis ball screw; 6, a table for fixing a workpiece; 7, a processing tank for storing a working fluid; and 8, a column for supporting a Z-axis unit 9, a lower arm 10 being fixed to the column 8. Further, the column 8 is either fixed or movable along the direction of the longitudinal axis of the lower arm 10. A distal end of this lower arm 10 has a shape in which about one third of the upper surface is cut out. Numeral 11 denotes a lower guide, and the lower guide 11 is mounted and fixed on the lower arm 10 in such a way that an approximately lower half of the lower guide 11 is accommodated in the cut-out portion at the distal end of the lower arm 10. Further, a roller is attached at a distal end of the lower arm 10 and in a lower portion of the lower guide 11, and effects a change in the direction of a wire electrode 12.

Numeral 13 denotes an upper guide fixed to a distal end of the Z-axis unit. Numeral 14 denotes a Y-axis guide which is fixed to the top of the bed 1, and a Y-axis slide 15 is engaged therewith and is supported in such a manner as to be movable in the axial direction. Numeral 16 denotes a Y-axis ball screw, and 17 and 18 denote Y-axis and X-axis motors, respectively. Numeral 19 denotes a wire recovering device which supports a recovery roller 20 for recovering the wire electrode and is fixed to the column 8. Numeral 21 denotes a recovery box for accommodating the recovered wire electrode 12. Numeral 22 denotes a wire bobbin; 23, a pad disposed underneath the bed; and 24, a leveling bolt for adjusting the inclination of the overall machine. Next, a detailed description will be given of the lower guide 11.

Figure 2:
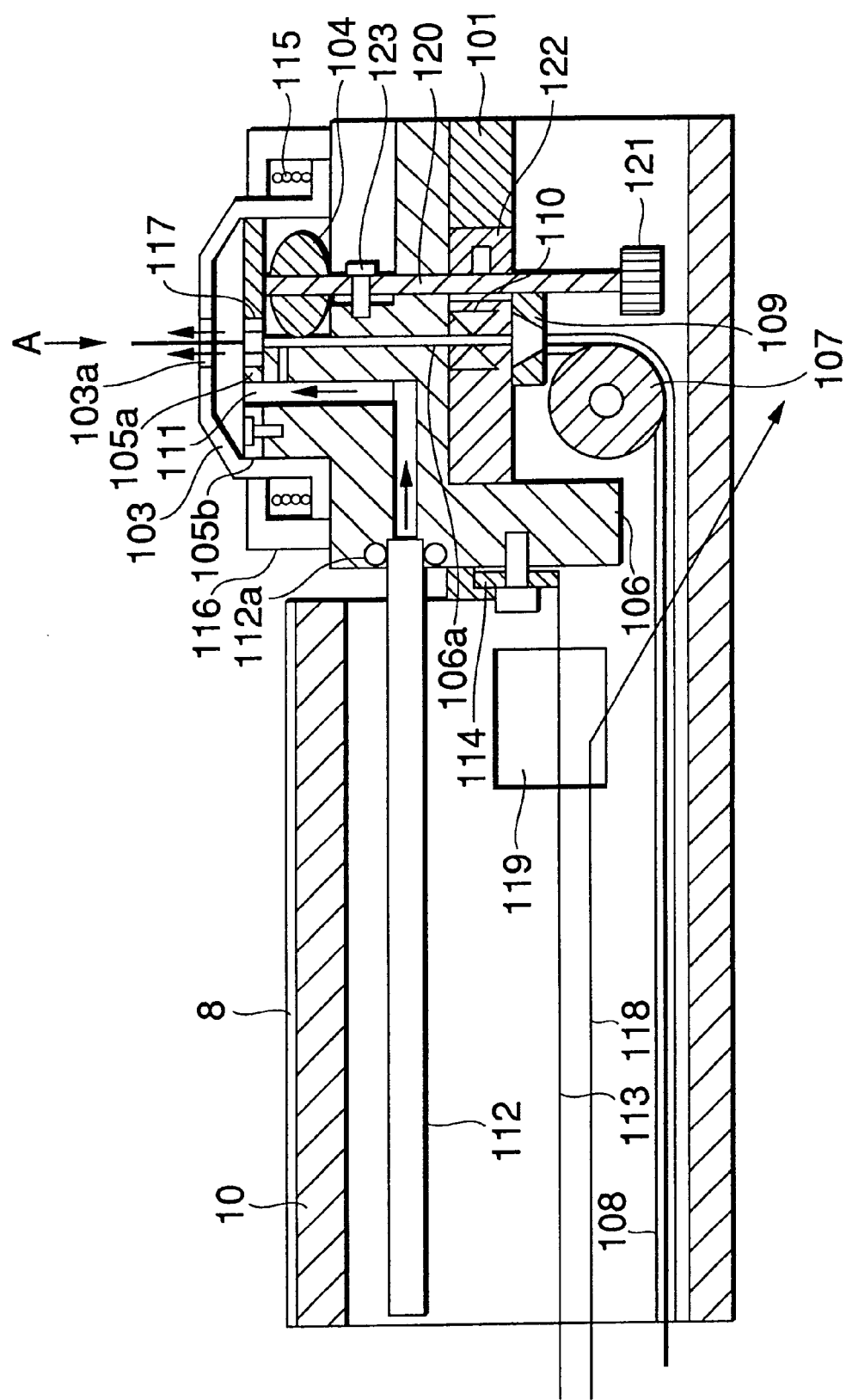
FIG. 2 is a longitudinal sectional view taken along the axial direction of a lower guide in accordance with a first embodiment of the present invention.
Figure 3:
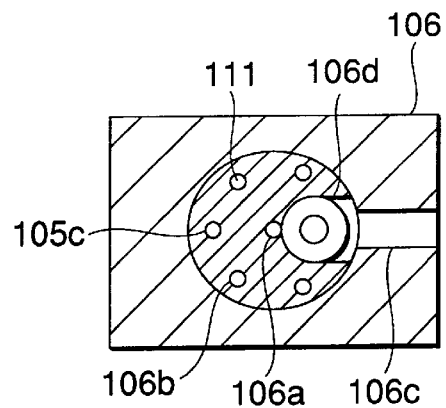
FIG. 3 is a partial horizontal sectional view of the lower block in accordance with the first embodiment of the present invention.
Figure 4:
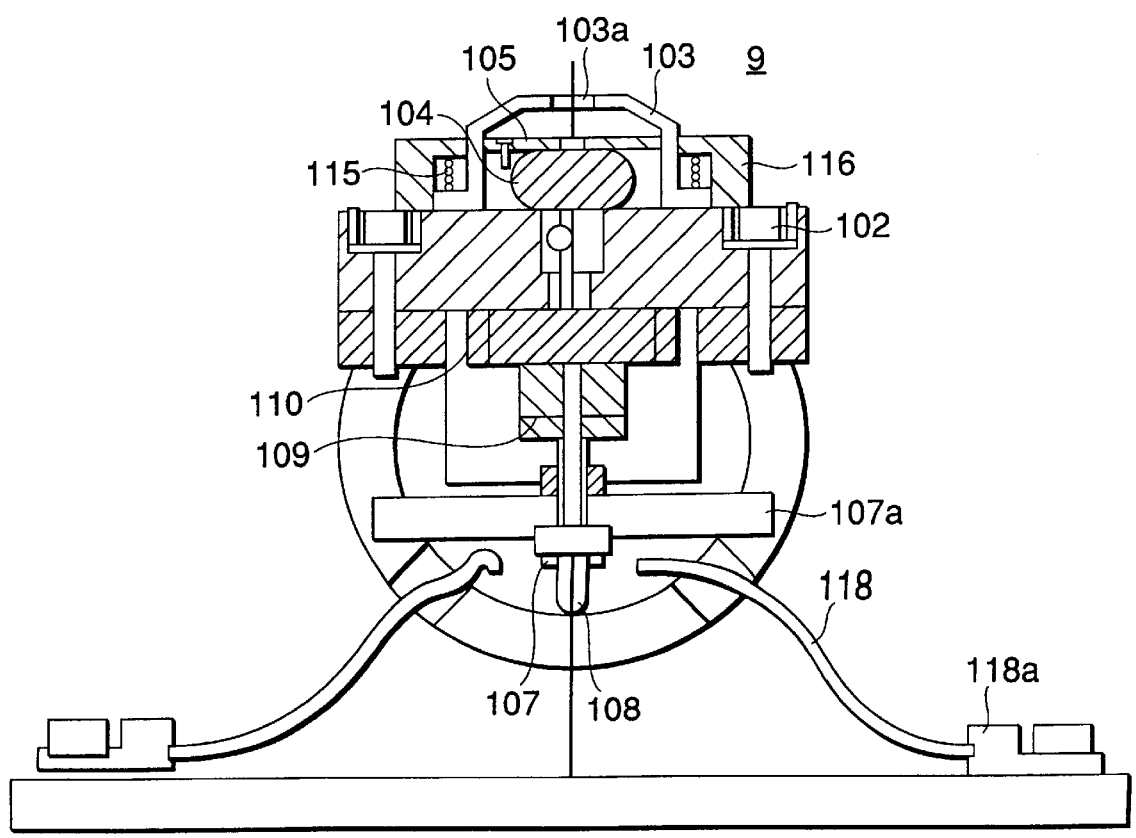
FIG. 4 is a transverse sectional view taken along the axial direction of the lower guide in accordance with the first embodiment of the present invention.

FIGS. 2, 3, and 4 are diagrams illustrating the lower guide 11 in the wire electric-discharge machine shown in FIG. 1. FIG. 2 is a longitudinal sectional view taken along the axial direction of the lower guide 11, FIG. 3 is a partial horizontal sectional view of the lower block, and FIG. 4 is a transverse sectional view taken along the axial direction of the lower guide 11.

The lower guide 11 is fixed to a distal end of the lower arm 10 by means of bolts 102 via an insulating plate 101. This attaching surface is perpendicular to the distal end of the lower arm 10. The lower guide 11 is mainly comprised of a lower nozzle 103, an electrical supply die 104, a lower wire guide holder 105, and a lower block 106, and the fixing of the lower guide 11 to the lower arm 10 is mainly effected by the lower block 106. The lower wire guide holder 105 is formed in the shape of a thin disk, has in its center a disk-shaped wire guide 105a having the same thickness as the lower wire guide holder 105, and is fixed to the lower block 106 by means of bolts 105c. Further, the lower wire guide holder 105 has an O-ring 105b around its outer peripheral portion, and the lower nozzle 103 abuts against the O-ring 105b in such a manner as to be vertically movable.

The electrical supply die 104 is disposed in a groove 106d provided in an upper portion of the lower block 106 and immediately below the lower wire guide holder 105, in such a manner as to contact the lower wire guide holder 105. Numeral 106b denotes a side wall of the lower block 106 which precisely fits to the lower nozzle 103. Numeral 106a denotes a wire passage where the wire electrode 12 inside the lower block 106 passes. A roller 107 for changing the direction is disposed at the distal end of the lower arm 10 in such a manner as to be located in the lower portion of the lower guide 11.

Numeral 108 denotes a recovery pipe for recovering the wire electrode 12. The recovery pipe 108 is passed inside the lower arm 10, is bent 90° upward by the roller 107, is then advanced straight, and is connected to a wire inlet 109. The wire inlet 109 is connected to a lower auxiliary guide 110 and has the function of guiding the wire electrode 12 downstream. In addition, at the portion of the recovery pipe 108 which abuts against the roller 107, the recovery pipe 108 and the roller 107 engage each other in a state in which the roller 107 bites into a portion of the recovery pipe 108, and the wire electrode 12 comes into contact with the surface of the roller 107 to undergo a change in its direction. At portions other than the roller portion, the wire electrode 12 is sent by the transport stream without coming into contact with the recovery pipe 108.

Numeral 111 denotes a passage for the working fluid leading to the interior of the lower nozzle 103, and continues from a pipe connecting port located at one end face of the lower block 106 facing the vertical cut-out surface of the lower arm 10 to the jetting port of the lower wire guide holder 105. Numeral 112 denotes a pipe for supplying the working fluid to the lower nozzle 103. The pipe 112 is passed inside the lower arm 10 and is connected to a connecting port of the passage 111 formed at the end face of the lower block 106. Numeral 112a denotes an O-ring for fixing the pipe 112 to the pipe connecting port at the end face of the lower block 106.

Numeral 113 denotes the wiring for supplying electricity to the electrical supply die 104, and the wiring 113 is passed inside the lower arm 10 and is connected to a terminal 114 located at the end face of the lower block 106 facing the vertical cut-out surface of the lower arm 10. Numeral 115 denotes a spring, and 116 denotes a pressing plate of the lower nozzle 103. During machining, the lower nozzle 103 is raised by means of the working fluid supplied to its interior while compressing the spring 115, and is stopped by the pressing plate 116, and during nonmachining, the lower nozzle 103 returns downward since the working fluid is not supplied. Numeral 117 denotes a passage which is used to allow the working fluid to flow for cooling the heat which is generated due to electrical discharge through contact energization between the electrical supply die 104 and the wire electrode 12 as well as Joule heat which is generated as electric current flows across the wire electrode 12. This passage 117 is formed by branching off from the passage 111 of the working fluid inside the lower block 106. Further, its constituent material is an insulating material such as a ceramic or resin.

Numeral 118 denotes the wiring different from the wiring 113, and the wiring 118 is passed through a window 119 of the lower arm 10, and is connected to a terminal 118d on the X-axis table 2. Numeral 120 denotes a shaft which is engaged with the center of a lower surface of the electrical supply die 104 and extends downward. Numeral 121 denotes a knob fixed to a distal end of the shaft 120. Numeral 122 denotes a supporting block for positioning the shaft, and the supporting block 122 is disposed underneath the lower block 106 at a position where the supporting block 122 is clamped by the lower auxiliary guide 110 and the insulating plate 101. Numeral 123 denotes a bolt for fixing the shaft 120 engaged with the electrical supply die 104 to the lower block 106, and the bolt 123 is disposed below the electrical supply die 104 in such a manner as to abut against the shaft 120 perpendicularly thereto. Numeral 106c denotes a passage for moving the bolt 123 fixing the shaft 120. Numeral 107a denotes a roller shaft of the roller 107.

Further, a detailed description will be given of the upper guide.

Figure 5:
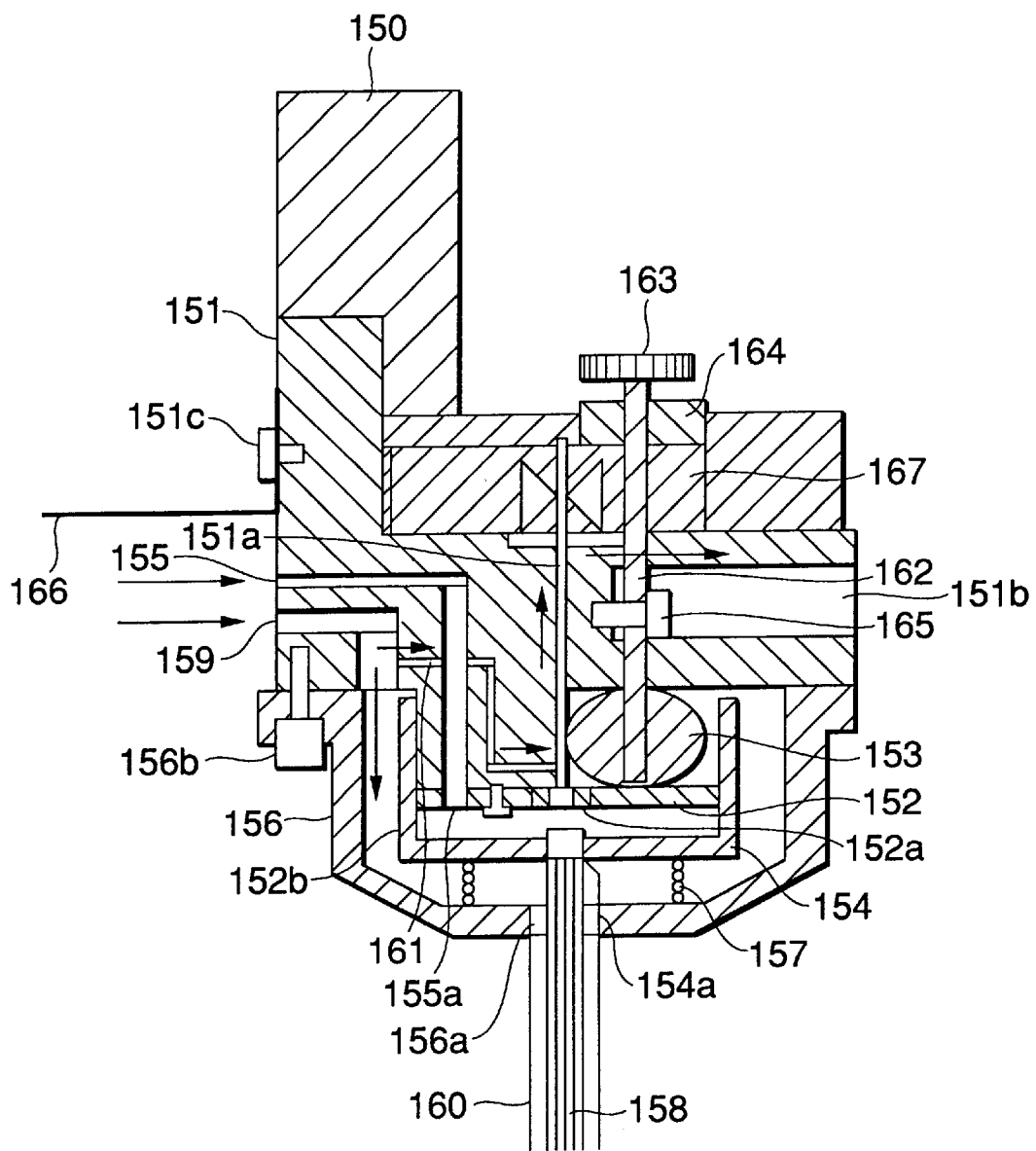
FIG. 5 is a vertical sectional view taken along the axial direction of an upper guide in accordance with the first embodiment of the present invention.

FIG. 5 is a vertical sectional view taken along the axial direction of the upper guide 13.

The upper guide 13 is fixed to a distal end of the Z-axis unit by means of an attaching plate 150. Numeral 151 denotes an upper block. Numeral 151a denotes a wire passage for passing the wire electrode 12 located inside the upper block 151. Numeral 152 denotes an upper wire guide holder which is formed in the shape of a thin disk, has a wire guide 152a in its center, and is fixed to the upper block 151 by means of bolts. An electrical supply die 153 is provided in the upper block 151 in such a manner as to be located immediately above the upper wire guide holder 152.

Numeral 154 denotes a jet nozzle which is precisely fitted to a lower portion of the upper block 151, and seals the working fluid jetted from a jetting port 155a in a passage 155. Further, an upper nozzle 156 has a spring 157 in its interior and constantly pushes the jet nozzle 154 upward, and the upper nozzle 156 is arranged such that it advances downward only when the working fluid is jetted from the jetting port 155a. The jetted working fluid forms a jet stream 158 by means of a jetting port 154a, and is supplied while guiding the wire electrode 12 toward the lower guide 11. Numeral 152b denotes an O-ring which is provided around an outer peripheral portion of the upper wire guide holder 152 and abuts against the same so that the jet nozzle becomes vertically movable. Numeral 156b denotes a bolt for fixing the upper nozzle 156 to the lower block 151.

Numeral 159 denotes a working fluid passage for supplying high-pressure working fluid to the space between the upper nozzle 156 and the jet nozzle 154. This working fluid flows out toward the workpiece in the form of a jet of working fluid 160 from a jetting port 156a. Incidentally, the jetting port 156a of the upper nozzle 156 and the jetting port 154a of the jet nozzle 154 are arranged to be coaxial. Numeral 161 denotes a passage which is used to allow the working fluid to flow for cooling the heat which is generated due to electrical discharge through contact energization between the electrical supply die 153 and the wire electrode 12 as well as Joule heat which is generated as electric current flows across the wire electrode 12. This passage 161 is formed by branching off from the working fluid passage 159. Further, its constituent material is an insulating material such as a ceramic or resin.

Numeral 162 denotes a shaft which engages the center of an upper surface of the electrical supply die 153 and extends upward. Numeral 163 denotes a knob fixed to a distal end of the shaft 162. Numeral 164 denotes a supporting block for positioning the shaft. Numeral 165 denotes a bolt for fixing the shaft 162 to the upper block 151. Numeral 151b denotes a passage for moving the bolt 165. Numeral 166 denotes the wiring for supplying electricity to the electrical supply die 153, and the wiring 166 is connected to a terminal 151 located at one end face of the upper block 151c. Numeral 167 denotes an upper auxiliary guide.

Figure 6:
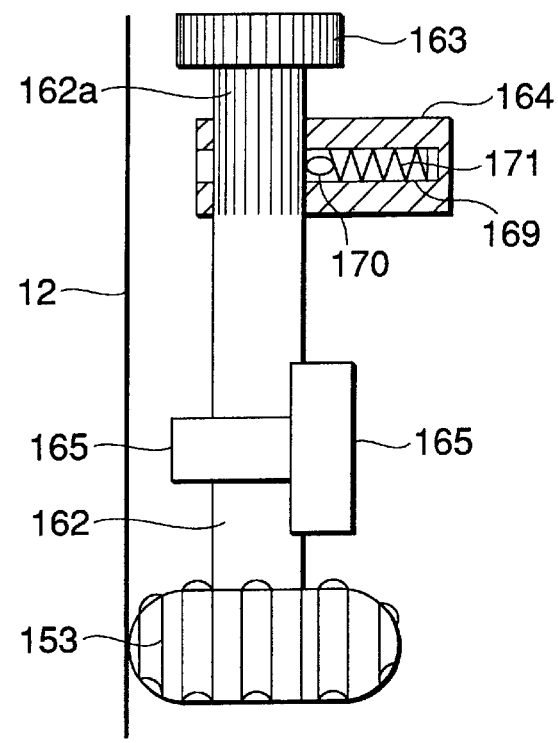
FIG. 6 is a partial vertical sectional view taken along the axial direction of an electrical supply die, a shaft, and its peripheral components in accordance with the first embodiment of the present invention.
Figure 7:
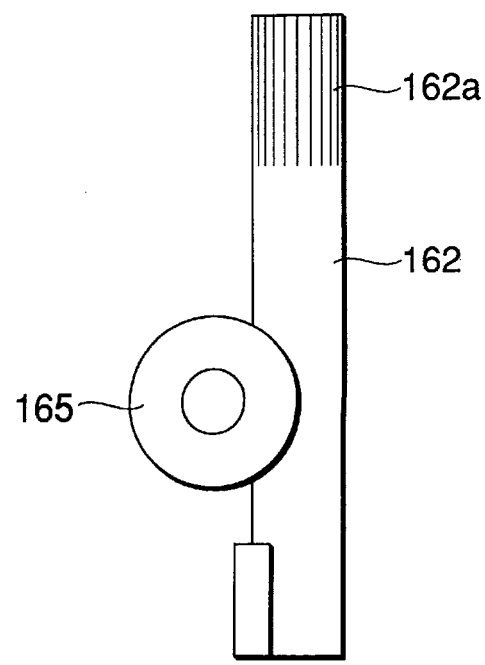
FIG. 7 is a conceptual view taken along the axial direction of the shaft and a bolt for fixing the shaft in accordance with the first embodiment of the present invention.
Figure 8:
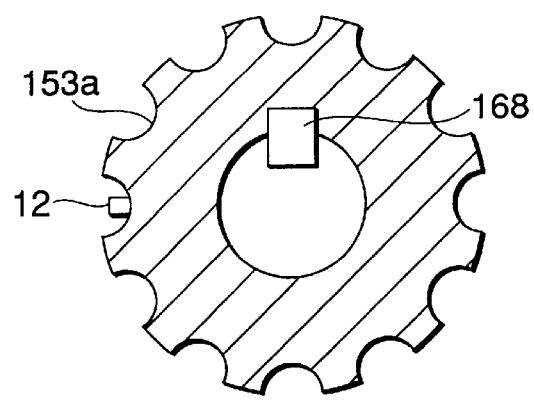
FIG. 8 is a top view of the electrical supply die in accordance with the first embodiment of the present invention.

Next, referring to FIGS. 6, 7, and 8, a detailed description will be given of the relationship among the electrical supply die 153, the shaft 162, the knob 163, the supporting block 164, and the bolt 165 for fixing the shaft 162 in the upper guide 13. FIG. 6 is a partial vertical sectional view taken along the axial direction of the electrical supply die and the shaft and its peripheral components. FIG. 7 is a conceptual view taken along the axial direction of the shaft and a bolt for fixing the shaft. FIG. 8 is a top view of the electrical supply die.

The structure of the electrical supply die 153 is such that it has grooves 153a in its outer periphery, and comes into contact with the wire electrode 12 in that groove portion to supply electricity. The shaft 162 engages the electrical supply die 153 in the center of its upper surface and is connected to the electrical supply die 153 by means of a key 168. In addition, grooves 162a in a corresponding number identical to the number of the grooves 153a of the electrical supply die are formed on an upper portion of the shaft 162. A ball 170 in a chamber 169 provided inside the supporting block 164 is accommodated in the groove 162a of the shaft, and the ball 170 is pressed against the shaft 162 by means of a spring 171.

In this case, to change the groove of the electrical supply die 153 for abutment against the wire electrode 12, a screwdriver or the like is first inserted into the passage 151b of the upper block 151, and the bolt 165 is loosened. In this state, if the knob 163 is rotated, the ball 170 moves forward and backward when it moves from one groove 162a of the shaft to another, so that the position of the groove 153a of the electrical supply die can be indexed by the position of the groove 162a of the shaft. As the bolt 165 is tightened, the electrical supply die 153 is pressed against the upper block 151. Consequently, the wire electrode 12 is brought into contact with the groove 153a of the electrical supply die, so that the working electric current supplied by the wiring 166 can be accurately transmitted to the wire electrode 12 without a loss. It should be noted that the arrangements of the electrical supply die 104, the shaft 120, the knob 121, the supporting block 122; and the bolt 123 for fixing the shaft 120 in the lower guide 11, as well as the relationship among them, are similar to those of the upper guide.

Thus, in the lower guide 11, the arrangement provided is such that the lower wire guide holder 105 is formed in the shape of a thin disk, the disk-shaped wire guide 105a having the same thickness as the lower wire guide holder 105 is provided in its center, and the electrical supply die 104 is located underneath the lower wire guide holder 105. Therefore, the portion of the electrical supply die contacting the wire electrode 12 can be located very close to the wire guide 105a, and the portion of the wire electrode 12 disposed upwardly of the electrical supply die 104 can be made short. As a result, the resistance is reduced, so that the working electric current can be increased, and the machining performance can be improved substantially. In the upper guide 13 as well, the arrangement provided is such that the upper wire guide holder 152 is formed in the shape of a thin disk, the disk-shaped wire guide 152a having the same thickness as the upper wire guide holder 152 is provided in its center, and the electrical supply die 153 is located immediately thereabove. Accordingly, it is possible to obtain a similar advantage.

In addition, in the lower guide 11 and the upper guide 13, since the passages 117 and 161 for allowing the working fluid to flow for cooling the heat generated due to electrical discharge through contact energization between the electrical supply dies 104 and 153 and the wire electrode 12 as well as Joule heat generated as electric current flows across the wire electrode are formed of an insulating material, it is possible to prevent the phenomenon that metals are deposited and clogging occurs due to the magnetization of the passages 117 and 161, making it impossible to obtain sufficient coolant and resulting in the cut-off of the wire. Thus, machining can be carried out continuously.

In addition, in a case where the upper wire guide holder 152 and the jet nozzle 154 in the upper guide 13 are replaced, by removing the upper nozzle 156 by loosening the bolt 156*b*, the jet nozzle 154 which was pushed upward by the spring 157 can also be removed at the same time, and the upper wire guide holder 152 can be removed by simply loosening the fastening part by a bolt or the like. Hence, the wire guide 152*a* can be easily replaced by another one having a different diameter. In reassembly, it suffices if operation is effected in the reverse order. Thus, the conventional four-component arrangement can be made into a three-component arrangement, and the replacement is facilitated, and the work efficiency can be enhanced.

In addition, the electrical supply dies 104 and 153 of the lower guide 11 and the upper guide 13 are respectively provided with the shafts 120 and 162 respectively having the knobs 121 and 163, grooves are formed on the electrical supply dies 104 and 153 and the shafts 120 and 162, and the supporting blocks 122 and 164 are provided. Therefore, when machining has progressed with resultant progress in the wear of the electrical supply dies 104 and 153, and even if it has become impossible to maintain contact for electrical supply, the groove contacting the wire electrode 12 can be changed to another one by manually turning the knobs 121 and 163. It is unnecessary to remove the electrical supply dies temporarily to the outside in the conventional manner, and it is possible to attain a reduction in the time and efficient operation.

(SECOND EMBODIMENT)

Figure 9:
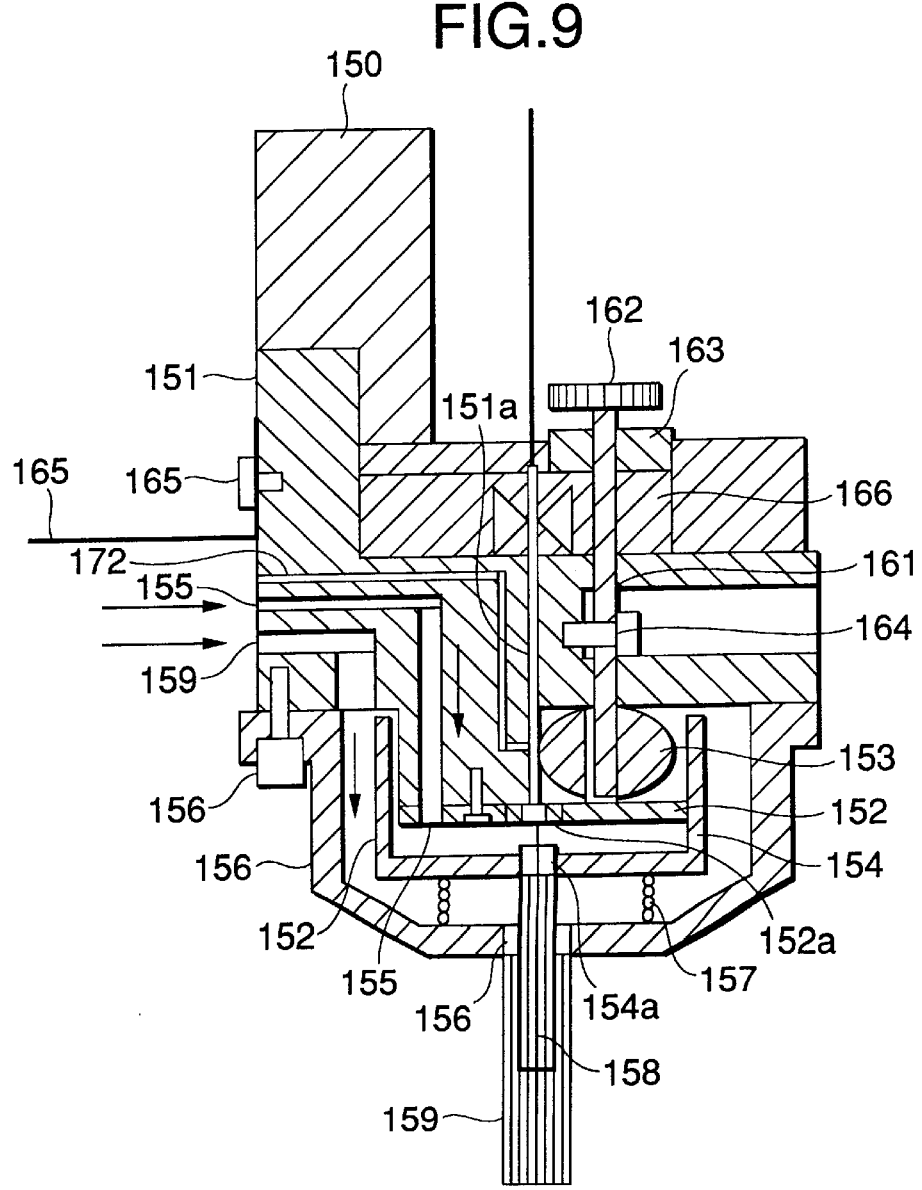
FIG. 9 is a vertical sectional view taken along the axial direction of the upper guide in accordance with a second embodiment of the present invention.

FIG. 9 is a longitudinal sectional view taken along the axial direction of the upper guide 13 of the wire electric-discharge machine in accordance with a second embodiment of the present invention. In this embodiment, the passage for allowing the working fluid to flow for cooling the heat generated due to electrical discharge through contact energization between the electrical supply die 153 and the wire electrode 12 as well as Joule heat generated as electric current flows across the wire electrode 12 is arranged differently in the upper guide 13 in accordance with the first embodiment shown in FIG. 5.

Reference numeral 172 denotes a cooling passage for allowing the coolant to flow, and this cooling passage 172 is formed in such a manner as to lead from the side surface of the upper block 151 contacting the Z-axis unit 9 to the portion of the wire passage 151*a* where the electrical supply die 153 and the wire electrode 12 contact. In addition, a working fluid is supplied to this cooling passage 172 through an independent pipe which is separate from the working fluid passage 159.

By adopting the above-described arrangement, unlike the conventional example in which the working fluid is allowed to flow by branching off from a portion of the working fluid passage 159, the working fluid is supplied from a separate pipe, so that the amount of fluid passed can be maintained to a fixed level without a change, and the frequency of the cut-off of the wire electrode 12 during machining can be reduced. Incidentally, a similar arrangement can be adopted for the lower guide 11 as well, and a similar advantage can be obtained.

(THIRD EMBODIMENT)

Figure 10:
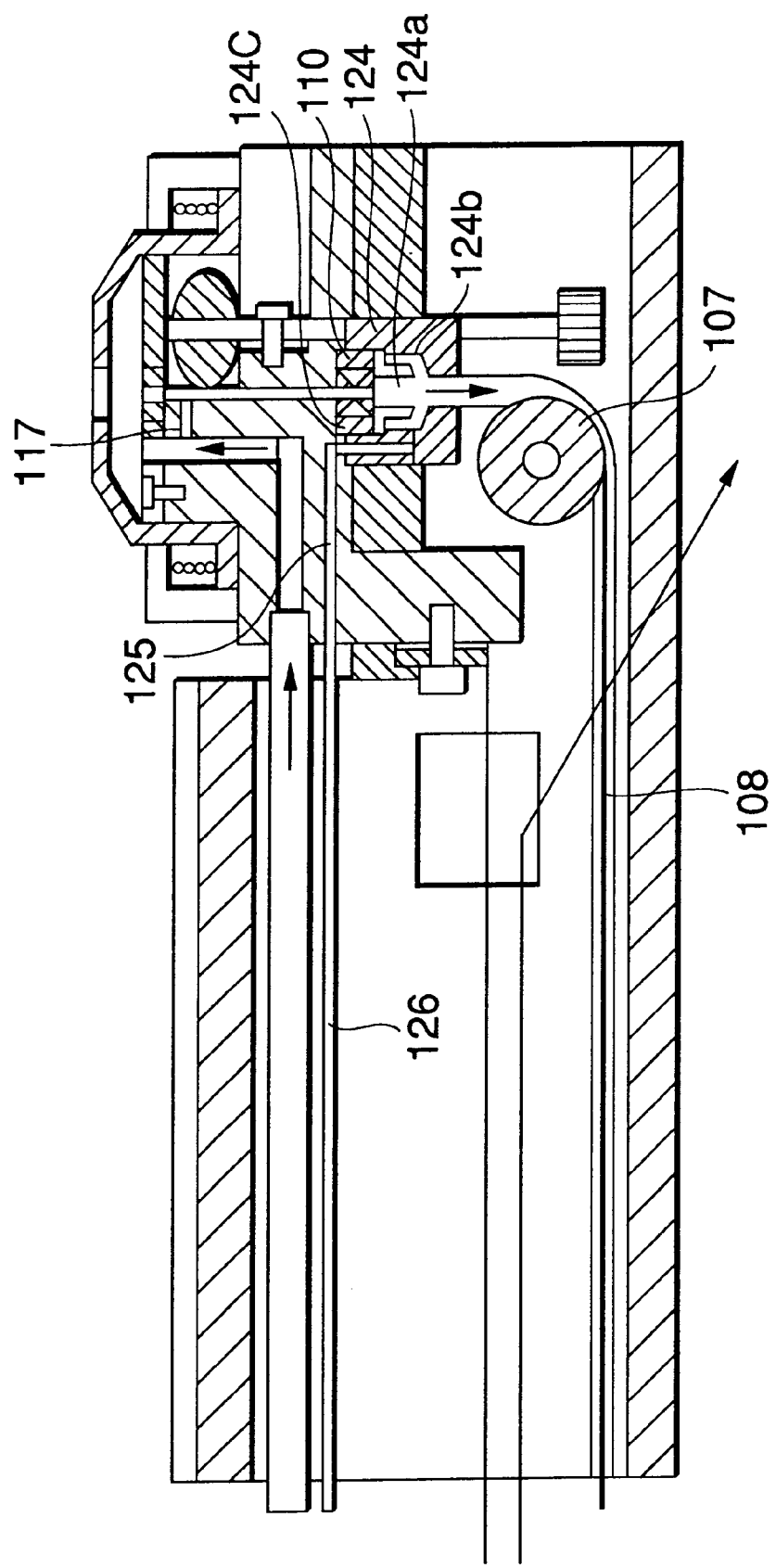
FIG. 10 is a cross-sectional view taken along the axial direction of the lower guide in accordance with a third embodiment of the present invention.

FIG. 10 is a cross-sectional view taken along the axial direction of the lower guide 11 in accordance with a third embodiment of the present invention. In this embodiment, a negative-pressure generating device is provided for sucking the wire electrode 12 in the lower guide 11 in accordance with the first embodiment shown in FIG. 2.

Reference numeral 124 denotes a negative-pressure generating device which is fitted in the lower block 106 in such a form as to cover a lower half of the lower auxiliary guide 110. In addition, the negative-pressure generating device 124 has a central passage 124*a* extending vertically from the center of its upper surface to the center of its lower surface, and this central passage 124*a* is connected to the wire outlet of the lower auxiliary guide 110 to allow the wire electrode 12 to pass therethrough. Further, the negative-pressure generating device 124 has an inclined passage 124*b* which joins the central passage 124*a* and is inclined downward.

Incidentally, the recovery pipe 108 is connected to the lower end of the central passage 124*a*. Numeral 125 denotes a passage formed in the lower block 106 for supplying the working fluid to the inclined passage 124*b* of the negative-pressure generating device 124. The passage 125 is formed in such a manner as to lead from one end face of the lower block 106 facing the vertical cut-out surface of the lower arm 10 to an inclined passage port 124*c* in a side of the negative-pressure generating device 124.

Numeral 126 denotes a pipe for supplying the working fluid to the passage 125. The wire electrode 12 is sent to the lower guide 11 by means of the jet stream 158 in the upper guide 13, passes through the wire guide 105*a* and the wire passage 106*a*, and reaches the lower auxiliary guide 110. At this point of time, in the negative-pressure generating device 124, the working fluid supplied from the passage 125 passes through the inclined passage 124*b*, jets out downward toward the lower portion of the central passage 124*a*, and generates negative pressure in the direction of the lower auxiliary guide 110, thereby sucking the wire electrode 12. The sucked wire electrode 12 is sent to the interior of the recovery pipe 108 together with the working fluid jetted out from the inclined passage 124*b*, and is transported via the roller 107.

As a result, the wire electrode 12 which has passed through the lower auxiliary guide 110 passes the lower roller 107 accurately, and is guided inside the recovery pipe 108.

(FOURTH EMBODIMENT)

Figure 11:
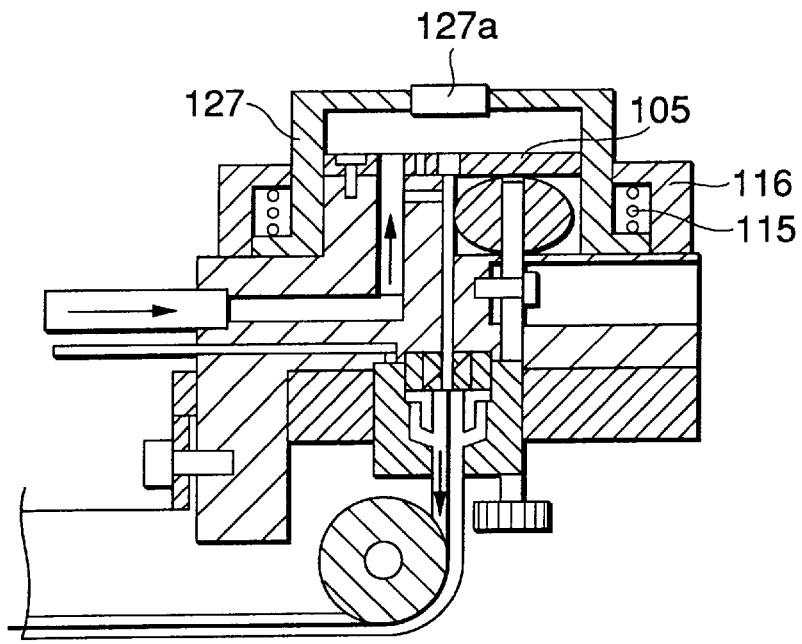
FIG. 11 is a cross-sectional view taken along the axial direction of the lower guide in accordance with a fourth embodiment of the present invention.

FIG. 11 is a cross-sectional view taken along the axial direction of the lower guide 11 in accordance with a fourth embodiment of the present invention. In this embodiment, a tip portion of the lower nozzle is formed in a flat shape in the lower guide 11 in accordance with the third embodiment shown in FIG. 10.

In the drawing, numeral 127 denotes a lower nozzle, and the arrangement provided is such that its tip portion where a jetting port 127*a* for jetting the working fluid is present is made flat. In addition, the space for accumulating the working fluid in the interior of the nozzle is formed into a hollow cylindrical shape in which the upper and lower surfaces are flat. During machining, the lower nozzle 127 is raised by the working fluid supplied to the interior while compressing the spring 115, and is stopped by the pressing plate 116. During nonmachining, since the working fluid is not supplied, the lower nozzle 127 returns to its lower position. Incidentally, even in the case where the lower nozzle 127 has returned to its lower position, since the lower wire guide holder 105 is formed in the shape of a thin disk, there is no need to take into consideration the contact of the lower wire guide holder 105 with the lower nozzle 127.

In such an arrangement, it is possible to prevent the situation experienced in the conventional art in which dynamic pressure exerts a principal effect, the flow rate varies, and the working fluid is jetted in a swirling manner. Instead, the dynamic pressure of the working fluid filled inside the lower nozzle 127 is reduced, the rate of conversion to static pressure becomes large, and the working fluid is jetted upward from the jetting port 127a with uniform pressure. As a result, the machining performance improves.

(FIFTH EMBODIMENT)

Figure 12:
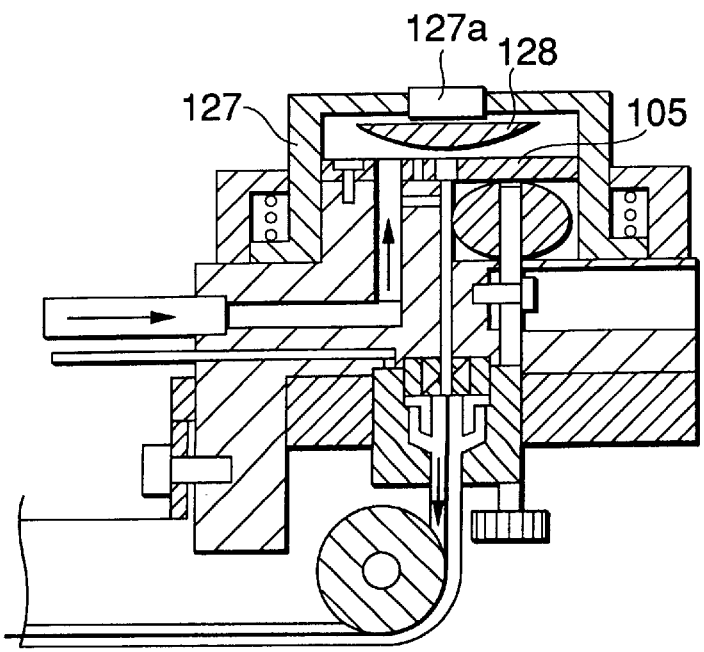
FIG. 12 is a cross-sectional view taken along the axial direction of the lower guide in accordance with a fifth embodiment of the present invention.

FIG. 12 is a cross-sectional view taken along the axial direction of the lower guide 11 in accordance with a fifth embodiment of the present invention. In this embodiment, a net is provided immediately below the jetting port of the lower nozzle in the lower guide 11 in accordance with the fourth embodiment shown in FIG. 11.

In the drawing, numeral 128 denotes a metal net which is arranged in such a manner as to be located immediately below the jetting port 127a inside the lower nozzle 127. In addition, the metal net 128 is larger than the jetting port 127a and is formed with a curve that covers the jetting port 127a at the inner side, and the arrangement provided is such that the working fluid cannot reach the jetting port 127a unless the working fluid passes through the metal net 128.

In such an arrangement, the flow rate of the working fluid filled inside the lower nozzle 127 is lowered while the working fluid passes through the metal net 128, and the pressure becomes static pressure as the working fluid passes through the metal net 128, so that the working fluid can be jetted reliably upward from the jetting port 127a. As a result, the machining accuracy improves, and it is possible to prevent scars from occurring on the machined surface and the machined surface from becoming rough. In particular, this arrangement is particularly effective in machining in which the machining speed is very slow or machining by using a small-diameter wire electrode.

(SIXTH EMBODIMENT)

Figure 13:
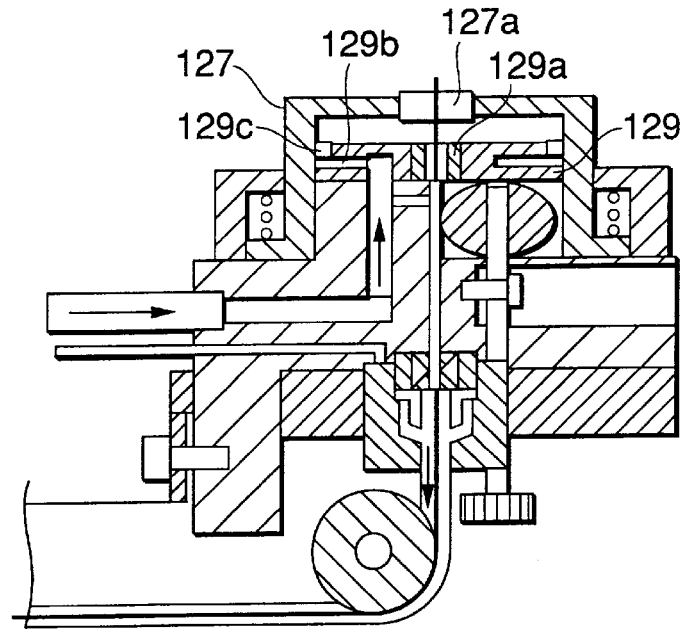
FIG. 13 is a cross-sectional view taken along the axial direction of the lower guide in accordance with a sixth embodiment of the present invention.

FIG. 13 is a cross-sectional view taken along the axial direction of the lower guide 11 in accordance with a sixth embodiment of the present invention. In this embodiment, the shape of the lower wire guide holder is modified in the lower guide 11 in accordance with the fifth embodiment shown in FIG. 12.

In the drawing, numeral 129 denotes a lower wire guide holder which is formed in the shape of a disk and has in its central portion a disk-shaped wire guide 129a having the same thickness as the lower wire guide holder 129. The lower wire guide holder 129 is constructed as a two-layered structure in which a space 129b is provided in its interior excepting its portion which abuts against and fixes the wire guide 129a. The arrangement provided is such that the passage 111 for supplying the working fluid is connected to the lower one of the two layers of the lower wire guide holder 129 so as to supply the working fluid to the space 129b. A supply opening 129c, which is a passage leading to the interior of the lower nozzle 127, is provided in an outer peripheral portion of the upper layer around its periphery, and allows the working fluid to be jetted therethrough along the inner wall of the lower nozzle 127.

By adopting such an arrangement, since the working fluid is supplied to the interior of the lower nozzle 127 after the flow is sufficiently rectified, it is possible to reduce the vibration of the wire electrode 12 due to the disturbance of the working fluid, improve the machining accuracy, and prevent the occurrence of surface roughness of the machined surface of the workpiece.

(SEVENTH EMBODIMENT)

Figure 14:
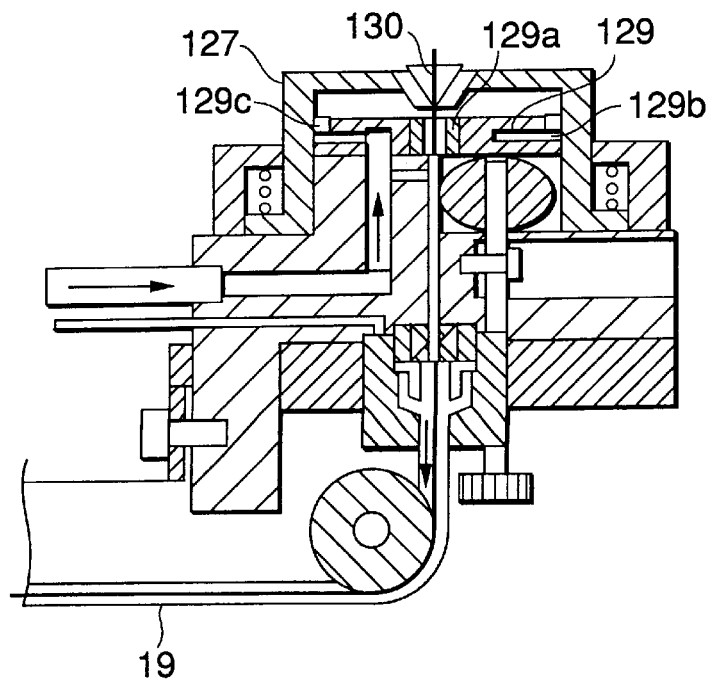
FIG. 14 is a cross-sectional view taken along the axial direction of the lower guide in accordance with a seventh embodiment of the present invention.
Figure 15:
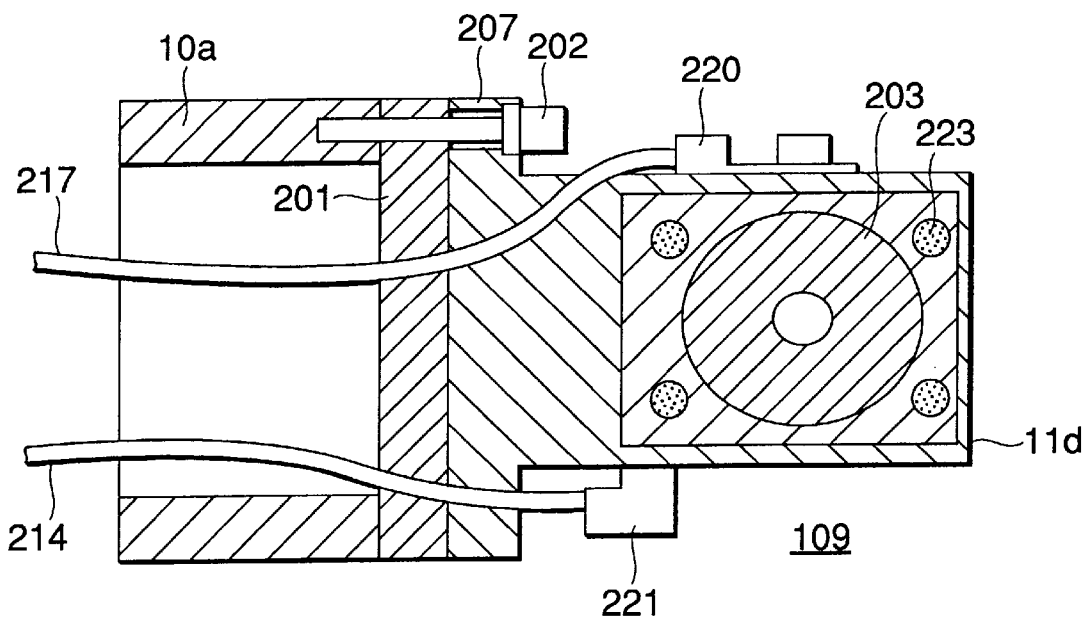
FIG. 15 is a horizontal sectional view taken along the axial direction of the lower guide of a wire electric-discharge machine in accordance with a conventional example.
Figure 16:
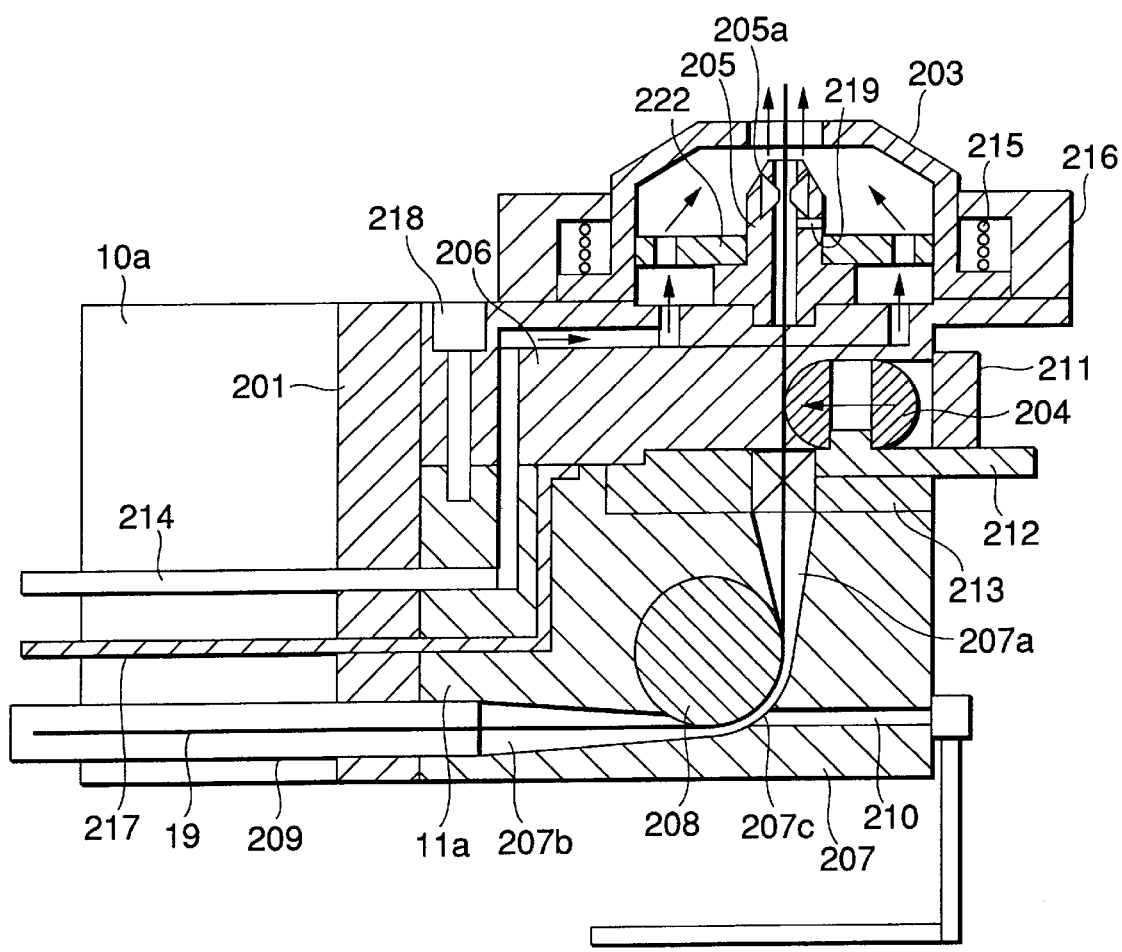
FIG. 16 is a cross-sectional view taken along the axial direction of the lower guide of the wire electric-discharge machine in accordance with the conventional example.
Figure 17:
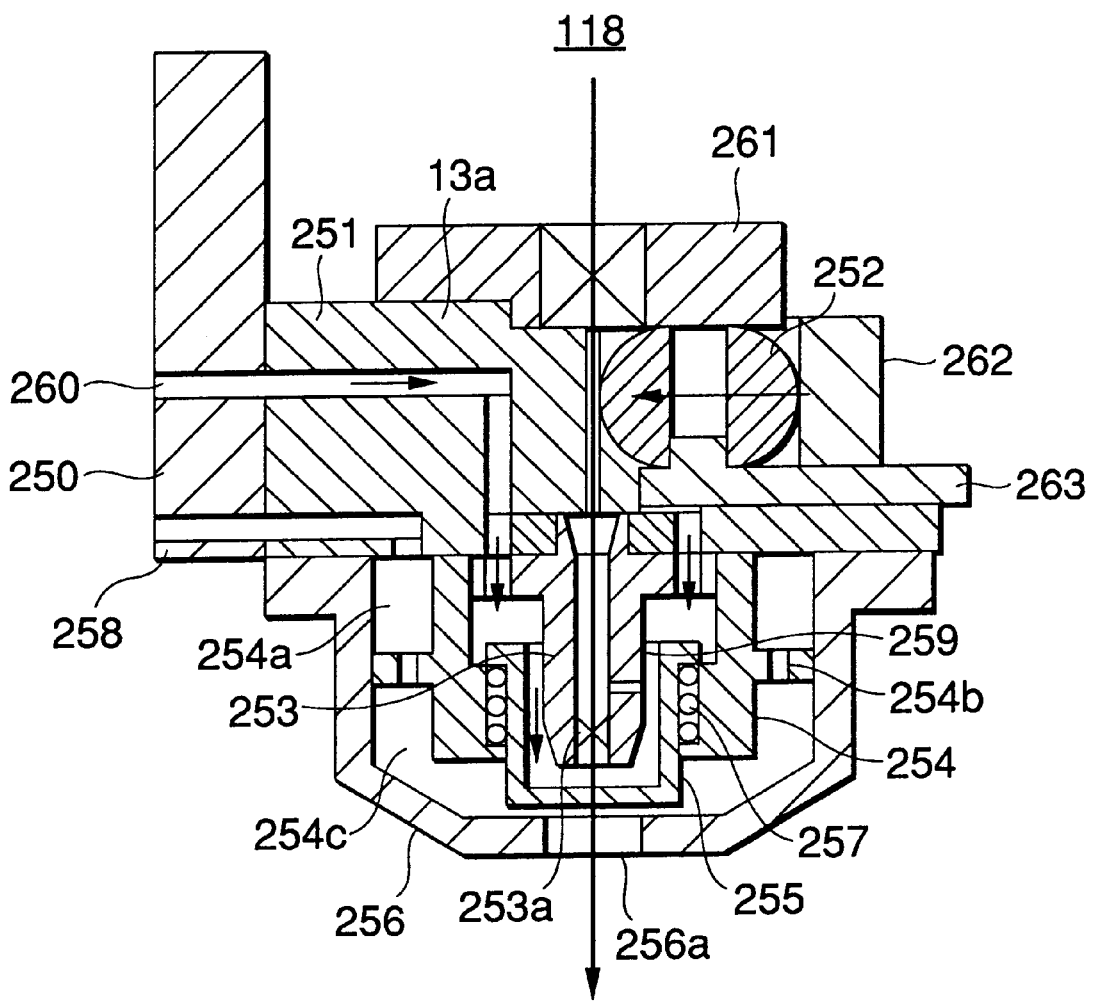
FIG. 17 is a horizontal sectional view taken along the axial direction of the upper guide of the wire electric-discharge machine in accordance with the conventional example.

FIG. 14 is a cross-sectional view taken along the axial direction of the lower guide 11 in accordance with a seventh embodiment of the present invention. In this embodiment, an inclined nozzle having the shape of a triangular pyramid is disposed in the nozzle supply opening in the lower guide 11 in accordance with the sixth embodiment shown in FIG. 13.

In the drawing, numeral 130 denotes an inclined nozzle having the shape of a triangular pyramid. The inclined nozzle 130 is disposed in the working fluid jetting port 127a in the lower nozzle 127 such that its diameter becomes gradually smaller in the downward direction. In addition, the tip of the inclined nozzle 130 is located immediately above the wire guide 129a of the lower wire guide holder 129.

By adopting such an arrangement, the insertion of the wire electrode 12 is facilitated since the wire electrode 12 sent through the upper guide 13 is passed along the tapered guide surface of the inclined nozzle 130, and is introduced to the wire guide 129a.

In accordance with the present invention, there is provided a wire electric-discharge machine wherein a disk-shaped lower wire guide holder and a wire guide located in a central portion of the lower wire guide holder and having the same thickness as the lower wire guide holder are provided in the lower nozzle located in an upper portion of the lower guide and adapted to jet a working fluid, and the electrical supply die is disposed immediately below the lower wire guide holder.

Consequently, the portion of the electrical supply die contacting the wire electrode can be located very close to the wire guide of the lower wire guide holder, and the wire electrode can be arranged in a very short distance. Hence, the resistance is reduced, so that the working electric current can be increased, and the machining performance can be improved substantially.

In addition, the lower guide and the upper guide are each provided with a shaft which engages a center of the electrical supply die and renders the electrical supply die rotatable.

Further, the electrical supply die is formed in the shape of a disk, and has a multiplicity of grooves on its outer periphery.

Further, a multiplicity of grooves corresponding to the grooves of the electrical supply die are formed on the shaft, and a supporting block for positioning the shaft as a ball is engaged in one of the grooves of the shaft is provided.

Further, a knob for rotating the shaft is provided at a distal end of the shaft.

Further, the lower guide and the upper guide are each provided with a bolt abutting against the shaft for fixing the position of the shaft as well as a passage for accommodating the bolt.

As a result, positioning can be effected without removing the electrical supply die, and the change in the position of the electrical supply die when the electrical supply die has become worn can be facilitated without stopping the machine.

In addition, in accordance with the present invention, there is provided a wire electric-discharge machine wherein a jet nozzle for inserting the wire electrode is provided above an upper nozzle of the upper guide via a spring such that jetting ports of the upper nozzle and the jet nozzle become coaxial, a disk-shaped upper wire guide holder and a wire guide located in a central portion of the upper wire guide holder and having the same thickness as the upper wire guide holder are provided in the jet nozzle, and the electrical supply die is disposed immediately above the upper wire guide holder.

Consequently, the removal and reinstallation of the jet nozzle and the upper wire guide holder can be facilitated.

In addition, in accordance with the present invention, there is provided a wire electric-discharge machine wherein the lower guide and the upper guide are each provided with a passage formed by an insulating material and adapted to supply a coolant to a wire passage where the wire electrode passes.

As a result, the passage through which the working fluid for cooling passes is prevented from clogging, and it is possible to prevent the cut-off of the wire electrode during machining and improve the machining efficiency.

In addition, in accordance with the present invention, there is provided a wire electric-discharge machine wherein the lower guide and the upper guide are each provided with a passage for supplying a working fluid to a lower nozzle of the lower guide and an upper nozzle of the upper guide and a passage for supplying a coolant to a wire passage where the wire electrode passes.

Consequently, it becomes possible to allow a fixed amount of coolant to flow constantly without a change in the amount of fluid passed depending on the state of machining, the frequency of the cut-off of the wire electrode during machining can be reduced, thereby making it possible to enhance the machining efficiency.

In addition, in accordance with the present invention, there is provided a wire electric-discharge machine wherein there are provided a negative-pressure generating device having a central passage for allowing the wire electrode to pass in a downward direction of the lower guide and an inclined passage connected to the central passage inclined downward, as well as a pipe for supplying the working fluid to the negative-pressure generating device.

Consequently, the wire electrode can be guided accurately through the recovery pipe through the lower roller, so that the insertion of the wire electrode can be facilitated remarkably.

In addition, in accordance with the present invention, there is provided a wire electric-discharge machine wherein a lower nozzle in which a tip portion of a jetting port for jetting a working fluid is flat is provided at an upper end of the lower guide.

Further, a net is provided immediately below the jetting port inside the lower nozzle.

Consequently, the orientation of the working fluid jetting out from the jetting port is rendered uniform, thereby stabilizing the machining.

In addition, in accordance with the present invention, there is provided a wire electric-discharge machine wherein a lower wire guide holder having a two-layered structure with a space formed between two layers and a wire guide located in a central portion of the lower wire guide holder and having the same thickness as the lower wire guide holder are provided in a lower nozzle located in an upper portion of the lower guide and adapted to jet a working fluid, and a working-fluid supplying port for supplying the working fluid into the space in the lower wire guide holder is provided in a lower layer portion of the lower wire guide holder.

Further, a passage for supplying the working fluid into the lower nozzle is provided in an outer periphery of an upper layer portion of the lower wire guide holder.

As a result, the working fluid is diffused sufficiently inside the nozzle, so that the flow rate becomes uniform. Hence, the working fluid jetting out from the jetting port is rectified, so that it is possible to reduce the vibration of the wire electrode due to the disturbance of the working fluid, improve the machining accuracy, and ameliorate the surface roughness of the cut surface of the workpiece.

In addition, in accordance with the present invention, there is provided a wire electric-discharge machine wherein an inclined nozzle having the shape of a triangular pyramid such that its diameter becomes gradually smaller in the downward direction is disposed in a nozzle opening in the lower guide.

Consequently, the insertion of the wire electrode into the lower guide can be facilitated.

What is claimed is:

1. A wire electric-discharge machine comprising:
   a wire electrode for machining a workpiece;
   a lower guide for supporting said wire electrode in a lower position;
   an upper guide for supporting said wire electrode in an upper position; and
   first and second electrical supply dies respectively located in said lower guide and said upper guide so as to supply electricity to said wire electrode, at least said first electrical supply die being formed as a disk;
   wherein said lower guide and said upper guide are each provided with a shaft which engages a center of a respective one of said first and second electrical supply dies and renders said respective die rotatable about an axis parallel to a travelling direction of said wire electrode.

2. The wire electric-discharge machine according to claim 1, wherein said first electrical supply die has a multiplicity of grooves in an outer periphery thereof.

3. The wire electric-discharge machine according to claim 2, wherein a first of said shafts has a multiplicity of grooves corresponding to the grooves of said first electrical supply die, and said lower guide and said upper guide further comprise:
   a supporting block for positioning said first shaft as a ball is engaged in one of the grooves of said shaft.

4. The wire electric-discharge machine according to claim 3, further comprising:
   a knob for rotating said first shaft, wherein said knob is provided at a distal end of said first shaft.

5. The wire electric-discharge machine according to claim 4, wherein said lower guide and said upper guide each further comprise:
   a bolt abutting against said respective shaft for fixing the position of said respective shaft as well as a passage for accommodating said bolt.

6. The wire electric-discharge machine according to claim 1, wherein said lower guide and said upper guide further comprise:

a passage formed by a non-magnetizable insulating material and adapted to supply a coolant to a wire passage where said wire electrode passes.

7. The wire electric-discharge machine according to claim 1, wherein said lower guide further comprises:

a negative-pressure generating device having a central passage for allowing said wire electrode to pass in a downward direction; and a pipe for supplying a working fluid to said negative-pressure generating device.

8. A wire electric-discharge machine comprising:

a wire electrode for machining a workpiece;

a lower guide for supporting said wire electrode in a lower position;

an upper guide for supporting said wire electrode in an upper position; two electrical supply dies respectively located in said lower guide and said upper guide so as to supply electricity to said wire electrode; and a lower wire guide holder having a two-layered structure with a space formed between the two layers, said lower wire guide holder comprising:

a wire guide located in a central portion of said lower wire guide holder, wherein said wire guide has the same thickness as said lower wire guide holder, and wherein said lower wire guide holder and said wire guide are provided in a lower nozzle located in an upper portion of said lower guide and adapted to jet a working fluid; and a working-fluid supplying port for supplying the working fluid into the space in said lower wire guide holder, wherein said working fluid supplying port is provided in a lower layer portion of said lower wire guide holder.

9. The wire electric-discharge machine according to claim 8, further comprising:

a passage for supplying the working fluid into said lower nozzle, wherein said passage is provided in an outer periphery of an upper layer portion of said lower wire guide holder.

10. The wire electric-discharge machine according to claim 8, wherein said lower wire guide holder is disk-shaped.

11. A wire electric-discharge machine comprising:

a wire electrode for machining a workpiece;

a lower guide for supporting said wire electrode in a lower position;

an upper guide for supporting said wire electrode in a upper position;

two electrical supply dies respectively located in said lower guide and said upper guide so as to supply electricity to said wire electrode; and a lower nozzle, provided at an upper end of said lower guide, having an upper interior surface, wherein said upper interior surface is flat.

12. The wire electric-discharge machine according to claim 11, wherein said lower nozzle further comprises:

a jetting port positioned in said upper interior surface of said lower nozzle; and a net provided immediately below said jetting port inside said lower nozzle.

13. The wire electric-discharge machine according to claim 4, wherein said lower nozzle defines an interior space having a hollow cylindrical shape, wherein upper and lower surfaces of said interior space are flat.

* * * * *